(12) United States Patent
Kurahashi

(10) Patent No.: US 11,543,642 B2
(45) Date of Patent: Jan. 3, 2023

(54) VARIABLE FOCAL LENGTH LENS DEVICE AND CONTROL METHOD OF VARIABLE FOCAL LENGTH LENS DEVICE

(71) Applicant: MITUTOYO CORPORATION, Kanagawa (JP)

(72) Inventor: Yuki Kurahashi, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 302 days.

(21) Appl. No.: 17/065,079

(22) Filed: Oct. 7, 2020

(65) Prior Publication Data
US 2021/0109336 A1    Apr. 15, 2021

(30) Foreign Application Priority Data

Oct. 11, 2019    (JP) .............................. JP2019-187307

(51) Int. Cl.
 G02B 21/24    (2006.01)
 G02B 21/06    (2006.01)
 G02B 26/00    (2006.01)
 G02B 3/14    (2006.01)

(52) U.S. Cl.
 CPC ............. *G02B 21/241* (2013.01); *G02B 3/14* (2013.01); *G02B 21/06* (2013.01); *G02B 26/004* (2013.01)

(58) Field of Classification Search
 CPC ........ G02B 21/241; G02B 3/14; G02B 21/06; G02B 26/004; G02B 21/02
 See application file for complete search history.

(56) References Cited

U.S. PATENT DOCUMENTS

| 10,281,700 B1 * | 5/2019 | Nahum | G02B 7/102 |
| 10,986,263 B2 * | 4/2021 | Sakai | G02B 7/08 |
| 2010/0177376 A1 | 7/2010 | Arnold et al. | |

* cited by examiner

*Primary Examiner* — Seung C Sohn
(74) *Attorney, Agent, or Firm* — Greenblum & Bernstein, P.L.C.

(57) ABSTRACT

A variable focal length lens device includes: a variable focal length lens whose focal length cyclically changes in accordance with an inputted drive signal; an image detector configured to detect an image of a measurement target through the variable focal length lens; a pulsed light illuminator configured to emit a pulsed light to illuminate the measurement target; and an illumination controller configured to control the pulsed light illuminator so that the pulsed light is emitted twice in one cycle of the drive signal based on two detection phases corresponding to a designated focal distance of the variable focal length lens.

3 Claims, 12 Drawing Sheets

VARIABLE FOCAL LENGTH LENS DEVICE AND CONTROL METHOD OF VARIABLE FOCAL LENGTH LENS DEVICE

The entire disclosure of Japanese Patent Application No. 2019-187307 filed Oct. 11, 2019 is expressly incorporated by reference herein.

TECHNICAL FIELD

The present invention relates to a variable focal length lens device and a control method of the variable focal length lens device.

BACKGROUND ART

A device in a form of a variable focal length lens device employing, for instance, a liquid lens system (sometimes simply referred to as a "lens system" hereinafter) based on a principle disclosed in Patent Literature 1 (U.S. Patent Application Publication No. 2010/0177376) has been developed.

The liquid lens system includes a cylindrical oscillator made of a piezoelectric material immersed in a transparent liquid. When AC (Alternating-Current) voltage is applied to an inner circumferential surface and an outer circumferential surface of the oscillator of the liquid lens system, the oscillator expands and contracts in a thickness direction thereof to oscillate the liquid inside the oscillator. Then, when the frequency of the applied voltage is tuned to an intrinsic frequency of the liquid, a concentric standing wave is created in the liquid to form concentric regions of different refractive indexes around a center axis of the oscillator. When light is introduced into the oscillator of the lens system along the center axis of the oscillator in this state, the light follows a diffusing or converging path depending on the refractive index of each of the concentric regions.

The variable focal length lens device includes the above-described liquid lens system and a focusing objective lens (e.g. a typical convex lens or lens group), which are arranged in a common optical axis. The liquid lens system, which is packaged as a liquid lens unit, is installed in the variable focal length lens device.

When a parallel light enters a typical objective lens, the light having passed through the lens is focused at a focal point located at a predetermined focal length from the lens. In contrast, when a parallel light enters the lens system disposed coaxially with the objective lens, the light, which is diverged or converged by the lens system, is focused at a position closer or farther than the original focal point (i.e. the focal point without the lens system) after having passed through the objective lens.

Accordingly, the focal point of the variable focal length lens device can be controlled as desired within a predetermined range (i.e. a range with a predetermined variation width capable of being added to/subtracted from the focal length of the objective lens using the lens system) by applying a drive signal inputted to the lens system (the AC voltage of a frequency capable of forming the standing wave in the internal liquid) and increasing or decreasing an amplitude of the drive signal.

The drive signal inputted to the lens system of the variable focal length lens device is, for instance, in a form of a sinusoidal AC signal. When the drive signal is inputted, the focal length (focal point) of the variable focal length lens device sinusoidally changes. At this time, when the amplitude of the drive signal is 0, the light passing through the lens system is not refracted and the focal length of the variable focal length lens device becomes equal to the focal length of the objective lens. When the amplitude of the drive signal is at a positive or negative peak, the light passing through the lens system is most greatly refracted and the focal length of the variable focal length lens device is most deviated from the focal length of the objective lens.

In order to capture an image by the above-described variable focal length lens device, a workpiece is illuminated by a pulse emission from a pulsed light illuminator at a predetermined phase of the drive signal. The pulsed illumination is thus applied when the sinusoidally shifting focal point reaches a predetermined focal point, at which the focused image of the workpiece is captured.

It should be noted that, in the lens system disclosed in Patent Literature 1, the cycle of the drive signal inputted to the lens system is 70 kHz, so that a time required for the cyclically changing focal point to reciprocatingly shift (i.e. undergo one cycle of reciprocal motion) (focal point change cycle) is approximately 14.3 μs. The variable focal length lens device using the lens system disclosed in Patent Literature 1 can obtain a less blurred image of an observed object by setting a sufficiently short pulsed illumination time with respect to the focal point change cycle.

However, a pulsed illumination time of several tens to hundreds μs is usually required in order to obtain a sufficiently bright image. With the above-described variable focal length lens device, it is thus difficult to obtain a sufficiently bright image through a single pulsed illumination period.

Accordingly, in the above-described variable focal length lens device, the pulsed illumination (tens to hundreds nanoseconds order per one time) is applied for a plurality of times in synchronization with a predetermined phase of the drive signal within a predetermined exposure time (millisecond order) during which an image detector such as a camera is exposed to light, thereby detecting a plurality of images at a predetermined focal length, the plurality of images being superimposed to form a single image. However, the above process requires a long time in order to obtain a sufficiently bright image.

SUMMARY OF INVENTION

An object of the invention is to provide a variable focal length lens and a control method of a variable focal length lens device, which are capable of obtaining a sufficiently bright image within a shorter time.

A variable focal length lens device according to an aspect of the invention includes: a variable focal length lens whose focal length is cyclically changeable in accordance with an inputted drive signal; an image detector configured to detect an image of a measurement target through the variable focal length lens; a pulsed light illuminator configured to emit a pulsed light to illuminate the measurement target; and an illumination controller configured to control the pulsed light illuminator so that the pulsed light is emitted twice in one cycle of the drive signal based on two detection phases corresponding to a designated focal distance of the variable focal length lens.

In the above aspect of the invention, the focal length of the variable focal length lens reciprocatingly changes in accordance with the change in the amplitude of the drive signal. Accordingly, there are two phases in one cycle of the drive signal at which the focal length reaches a predetermined distance.

In view of the above, the illumination controller controls the pulsed light illuminator on the basis of the two detection phases corresponding to the designated focal distance in the above aspect of the invention. Thus, the pulsed light illuminator can emit pulsed light at each of two timings when the focal length of the variable focal length lens becomes close to the designated focal distance, in one cycle of the drive signal. The image detector detects the image of the measurement target illuminated with the pulsed light emitted by the pulsed light illuminator (i.e. the image focused at the designated focal point).

In contrast, the pulsed light illuminator of typical variable focal length lens devices is configured to emit the pulsed light at a predetermined phase of the drive signal. In other words, the typical variable focal length lens devices can perform the pulsed light illumination only once in one cycle of the drive signal.

The variable focal length lens device of the above aspect of the invention can detect twice as many number of images in one cycle of the drive signal as that in the typical devices. In other words, the number of image detection per time (detection frequency) can be doubled as compared with the typical devices.

Thus, in the above aspect of the invention, a total illumination time in one cycle of the drive signal Cf can be extended twice as long as that in the typical devices with the same illumination time of the pulsed light illuminator. Accordingly, when the image detector keeps being exposable to light during a plurality of cycles of the drive signal in order to obtain a sufficiently bright image, the total exposure time can be reduced in the above aspect of the invention to half of the exposure time in the typical devices without changing the illumination time of one shot of pulsed light of the pulsed light illuminator. Thus, the time required for forming a sufficiently bright image can be reduced.

The variable focal length lens device according to the above aspect of the invention preferably further includes: a detection phase setting unit configured to calculate the two detection phases corresponding to the designated focal distance based on the designated focal distance of the variable focal length lens, and set the two calculated detection phases in the illumination controller, where when the designated focal distance is larger than a first predetermined value defined near a positive peak of the focal length or smaller than a second predetermined value defined near a negative peak of the focal length, the detection phase setting unit calculates the two detection phases so that a time corresponding to a phase width between the two detection phases is equal to or more than predetermined time.

In the above arrangement of the above aspect of the invention, the predetermined time refers to, for instance, a total time of a pulse emission time for one shot of the pulsed light by the pulsed light illuminator and a preparation time for the next light emission. According to the above arrangement, irrespective of the designated focal distance inputted within the variable range of the focal length, the pulsed light illumination can be safely performed twice in one cycle.

A control method according to another aspect of the invention is for a variable focal length lens device including: a variable focal length lens whose focal length is cyclically changeable in accordance with an inputted drive signal; an image detector configured to detect an image of a measurement target through the variable focal length lens; and a pulsed light illuminator configured to emit a pulsed light to illuminate the measurement target, the method including: controlling the pulsed light illuminator to emit the pulsed light twice in one cycle of the drive signal based on two detection phases of the drive signal corresponding to a designated focal distance of the variable focal length lens.

According to the above aspect of the invention, the same advantages as those of the above-described variable focal length lens device can be achieved.

According to the above aspects of the invention, a variable focal length lens capable of obtaining a sufficiently bright image within a shorter time can be provided.

BRIEF DESCRIPTION OF DRAWING(S)

FIG. 1 schematically shows a variable focal length lens device according to an exemplary embodiment of the invention.

FIG. 2 schematically shows a configuration of a liquid lens unit in the exemplary embodiment.

FIG. 3 schematically shows an oscillation state of the liquid lens unit in the exemplary embodiment.

FIG. 4 schematically shows a focal length of the liquid lens unit in the exemplary embodiment.

DESCRIPTION OF EMBODIMENT(S)

An exemplary embodiment of the invention will be described below with reference to the attached drawings.
Variable Focal Length Lens Device 1

Figure 1:
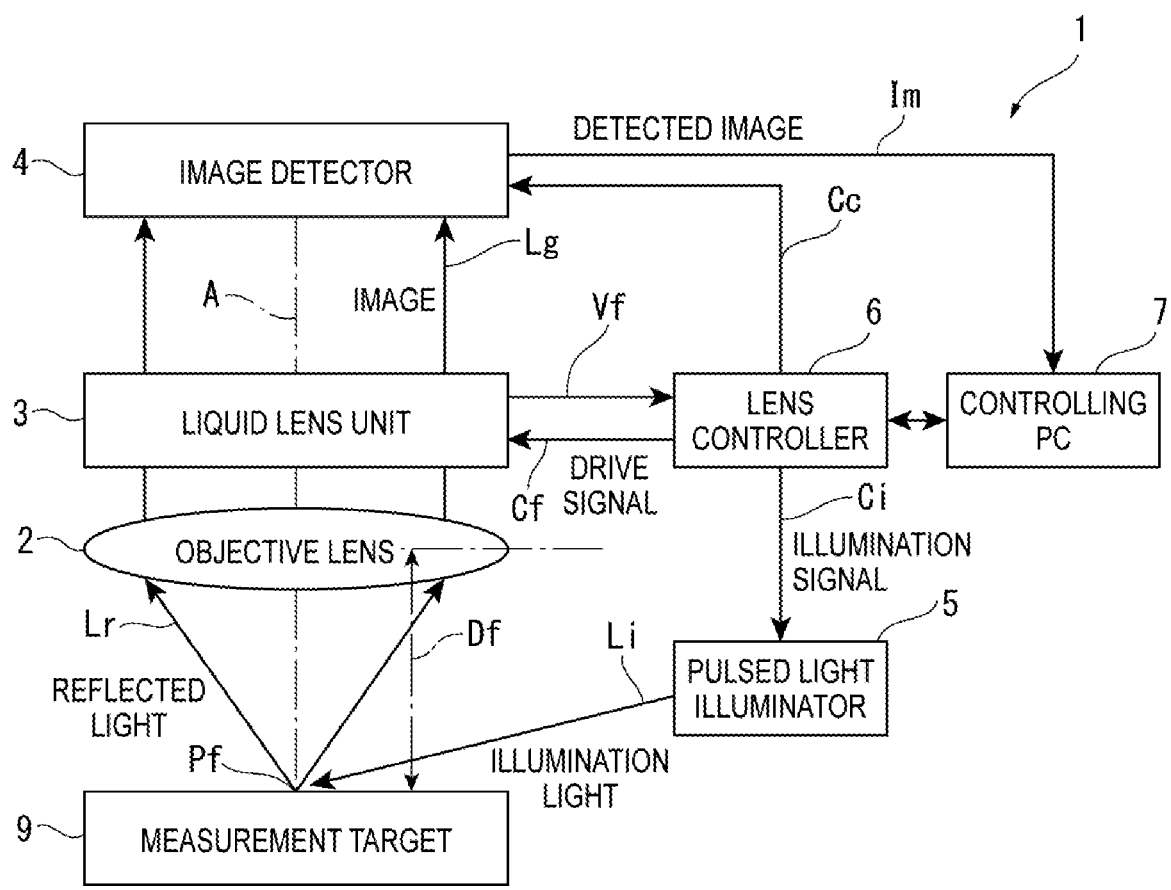

As shown in FIG. 1, a variable focal length lens device 1 is configured to detect an image of a surface of a measurement target 9 while varying a focal length thereof.

The variable focal length lens device 1 includes: an objective lens 2 and a liquid lens unit 3 which are disposed in a common optical axis A intersecting the surface of the measurement target 9; an image detector 4 configured to detect the image of the measurement target 9 through the objective lens 2 and the liquid lens unit 3; and a pulsed light illuminator 5 configured to apply pulsed light illumination on the surface of the measurement target 9.

The variable focal length lens device 1 further includes: a lens controller 6 configured to control an operation of the liquid lens unit 3 and the pulsed light illuminator 5; and a controlling PC 7 configured to operate the lens controller 6.

An existing personal computer is used as the controlling PC 7. The desired function of the controlling PC 7 is achieved by running a predetermined control software on the controlling PC 7. The controlling PC 7 is also configured to capture and process an image from the image detector 4.

An existing convex lens is used as the objective lens 2.

The image detector 4, which includes an existing charge coupled device (CCD) image sensor, other type of a camera or the like, is configured to receive an image Lg and output the image Lg to the controlling PC 7 in a form of a detected image Im of a predetermined format.

The pulsed light illuminator 5 includes a light-emitting device such as an LED (Light Emitting Diode). The pulsed light illuminator 5 is configured to emit an illumination light Li for a predetermined time to apply the pulsed light illumination on the surface of the measurement target 9 upon a rise in an illumination signal Ci inputted from the lens controller 6. The illumination light Li is reflected at the surface of the measurement target 9. A reflected light Lr from the surface of the measurement target 9 forms the image Lg through the objective lens 2 and the liquid lens unit 3.

The liquid lens unit 3, in which a liquid lens system is provided, is configured to change a refractive index thereof in response to a drive signal Cf inputted from the lens controller 6. The drive signal Cf is a sinusoidal AC signal of a frequency capable of forming a standing wave in the liquid lens unit 3.

A focal length Df to a focal point Pf of the variable focal length lens device 1 can be changed as desired based on a focal length of the objective lens 2 by changing the refractive index of the liquid lens unit 3.

The objective lens 2 and the liquid lens unit 3 thus correspond to the variable focal length lens of the invention.

Liquid Lens Unit 3

Figure 2:
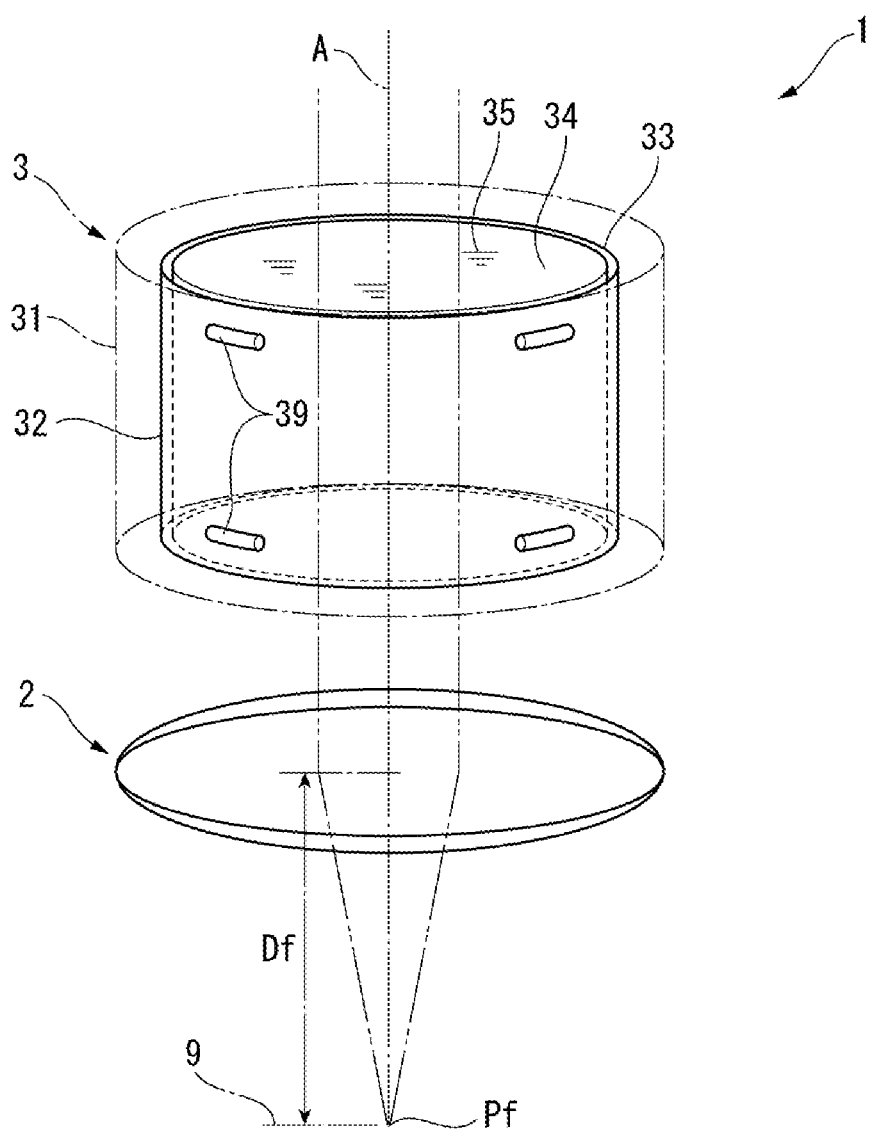

As shown in FIG. 2, the liquid lens unit 3 includes a cylindrical case 31 and a cylindrical oscillator 32 disposed inside the case 31. The oscillator 32 includes an outer circumferential surface 33 and is supported by an elastomeric spacer 39 interposed between the outer circumferential surface 33 and an inner circumferential surface of the case 31.

The oscillator 32 is a cylindrical component made of a piezoelectric material. The oscillator 32 is configured to oscillate in a thickness direction thereof when the AC voltage of the drive signal Cf is applied between the outer circumferential surface 33 and an inner circumferential surface 34 of the oscillator 32.

An interior of the case 31 is filled with a highly transparent liquid 35. The oscillator 32 is entirely immersed in the liquid 35 and an interior of the cylindrical oscillator 32 is filled with the liquid 35. The frequency of the AC voltage of the drive signal Cf is tuned to a frequency capable of forming a standing wave in the liquid 35 inside the oscillator 32.

Figure 3:
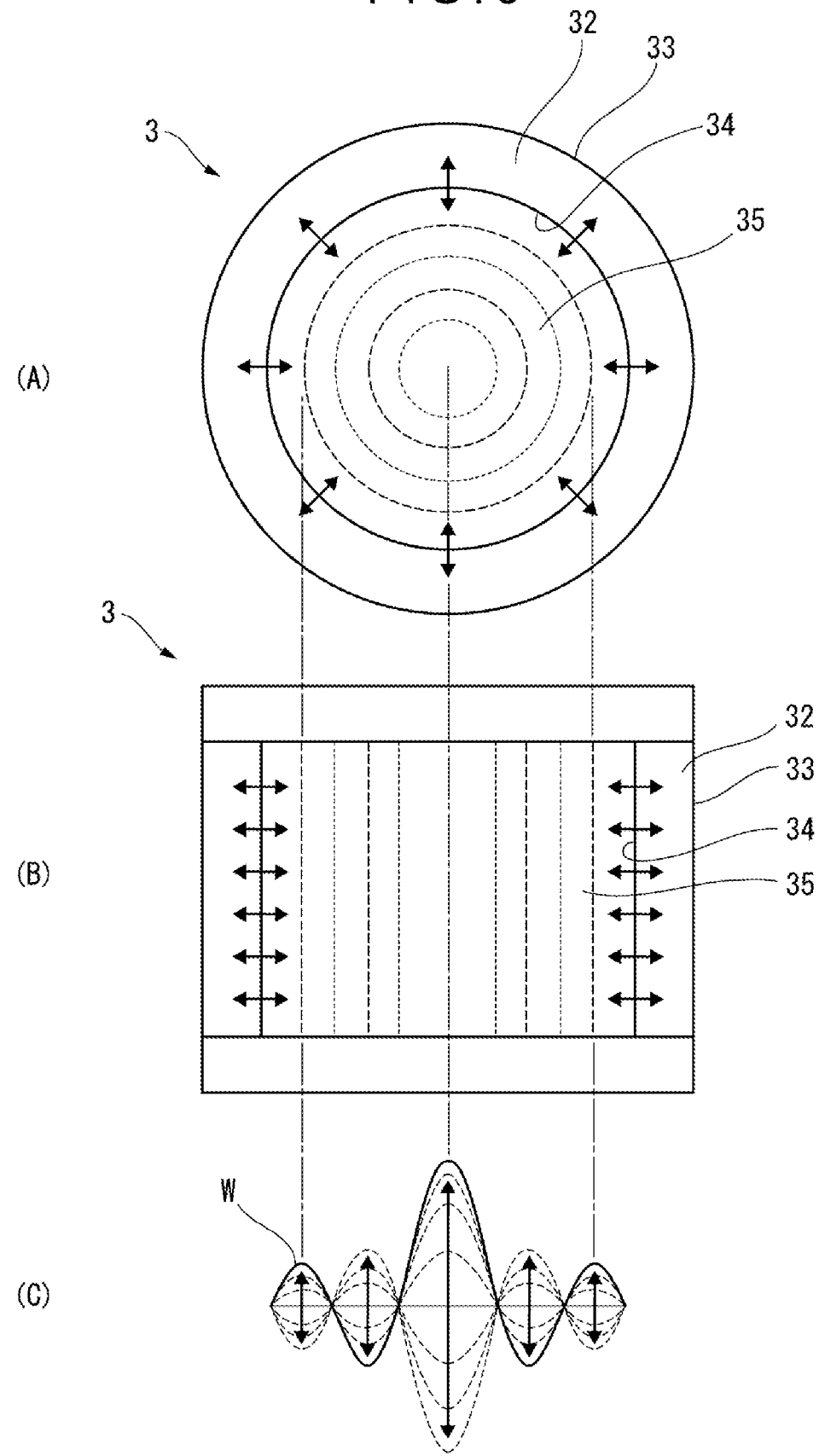

As shown in FIG. 3, when the oscillator 32 of the liquid lens unit 3 is oscillated, a standing wave is formed in the liquid 35 to create concentric regions with alternating refractive indexes (see FIGS. 3(A) and 3(B)).

A relationship between a distance (radius) from a central axis of the liquid lens unit 3 and the refractive index of the liquid 35 at this time is represented by a refractive index distribution W shown in FIG. 3(C).

Figure 4:
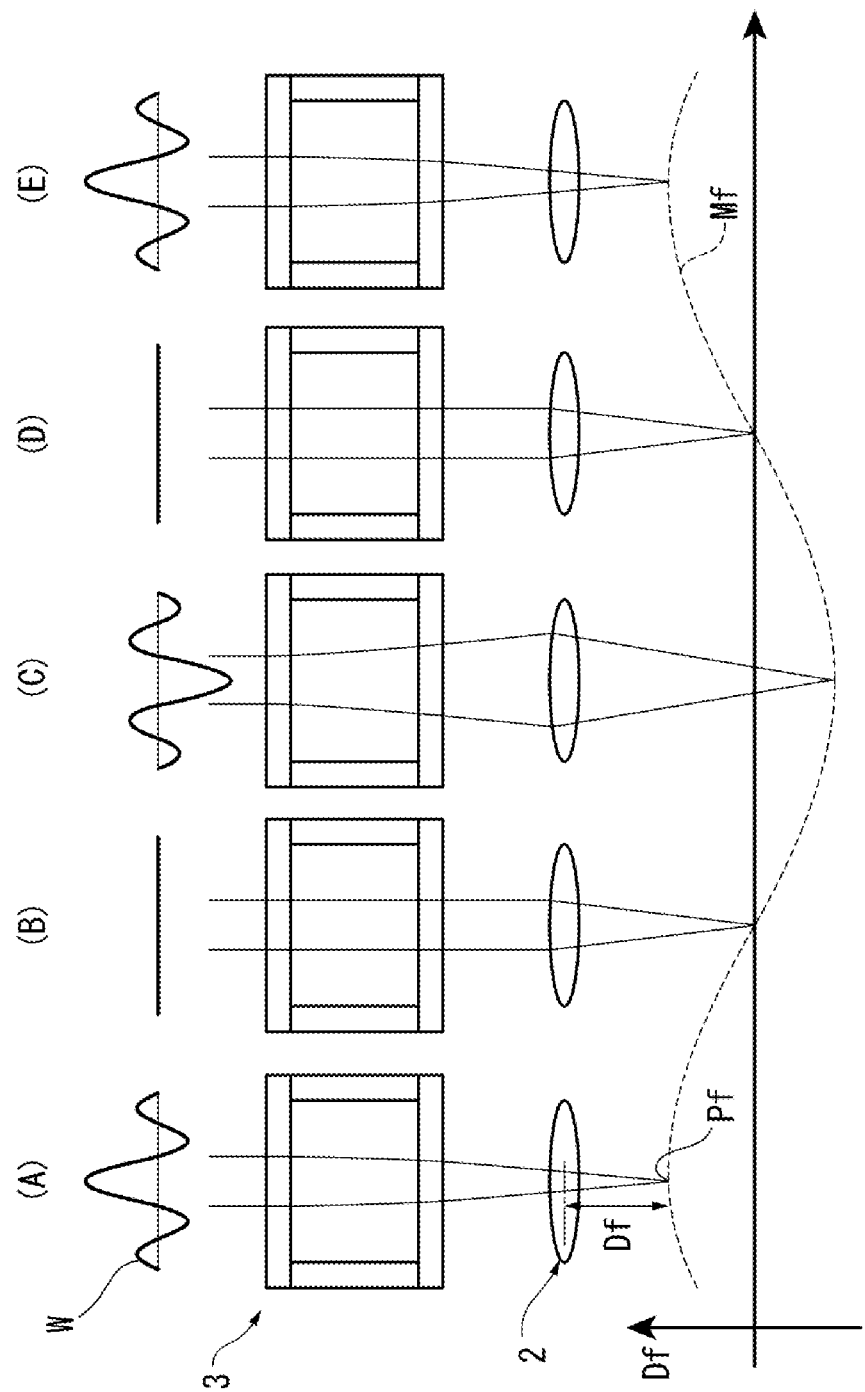

As shown in FIG. 4, the drive signal Cf, which is a sinusoidal AC signal, causes a corresponding change in a variation width of the refractive index distribution W of the liquid 35 in the liquid lens unit 3. The refractive index of the concentric regions formed in the liquid 35 sinusoidally changes to cause a sinusoidal variation in the focal length Df to the focal point Pf.

A difference between the maximum and minimum values in the refractive index distribution W is maximized in the state shown in FIG. 4(A), where the liquid lens unit 3 converges the light passing therethrough, the focal point Pf is located close to the liquid lens unit 3 and the focal length Df is shortest.

The refractive index distribution W is flat in the state shown in FIG. 4(B), where the liquid lens unit 3 lets the light through without refraction, and the focal point Pf and the focal length Df are at standard values.

The difference between the maximum and minimum values in the refractive index distribution W is maximized in the state shown in FIG. 4(C) with a polarity reverse to that in FIG. 4(A), where the liquid lens unit 3 diffuses the light passing therethrough, the focal point Pf is located remote from the liquid lens unit 3 and the focal length Df is largest.

The refractive index distribution W is flat in the state shown in FIG. 4(D), where the liquid lens unit 3 lets the light through without refraction, and the focal point Pf and the focal length Df are at standard values.

The refractive index distribution W in FIG. 4(E) is returned to the state in FIG. 4(A), and the same variation in the refractive index distribution W will be repeated thereafter.

As described above, the drive signal Cf of the variable focal length lens device 1 is a sinusoidal AC signal and the focal point Pf and the focal length Df also sinusoidally and cyclically change as shown in a focal-point-variation waveform Mf in FIG. 4.

In other words, the focal length Df reciprocatingly varies in accordance with the change in the amplitude of the drive signal Cf in the variable focal length lens device 1. Thus, there are two phases at which the focal length Df reaches a predetermined distance in one cycle of the drive signal Cf.

Lens Controller and Controlling PC

Figure 5:
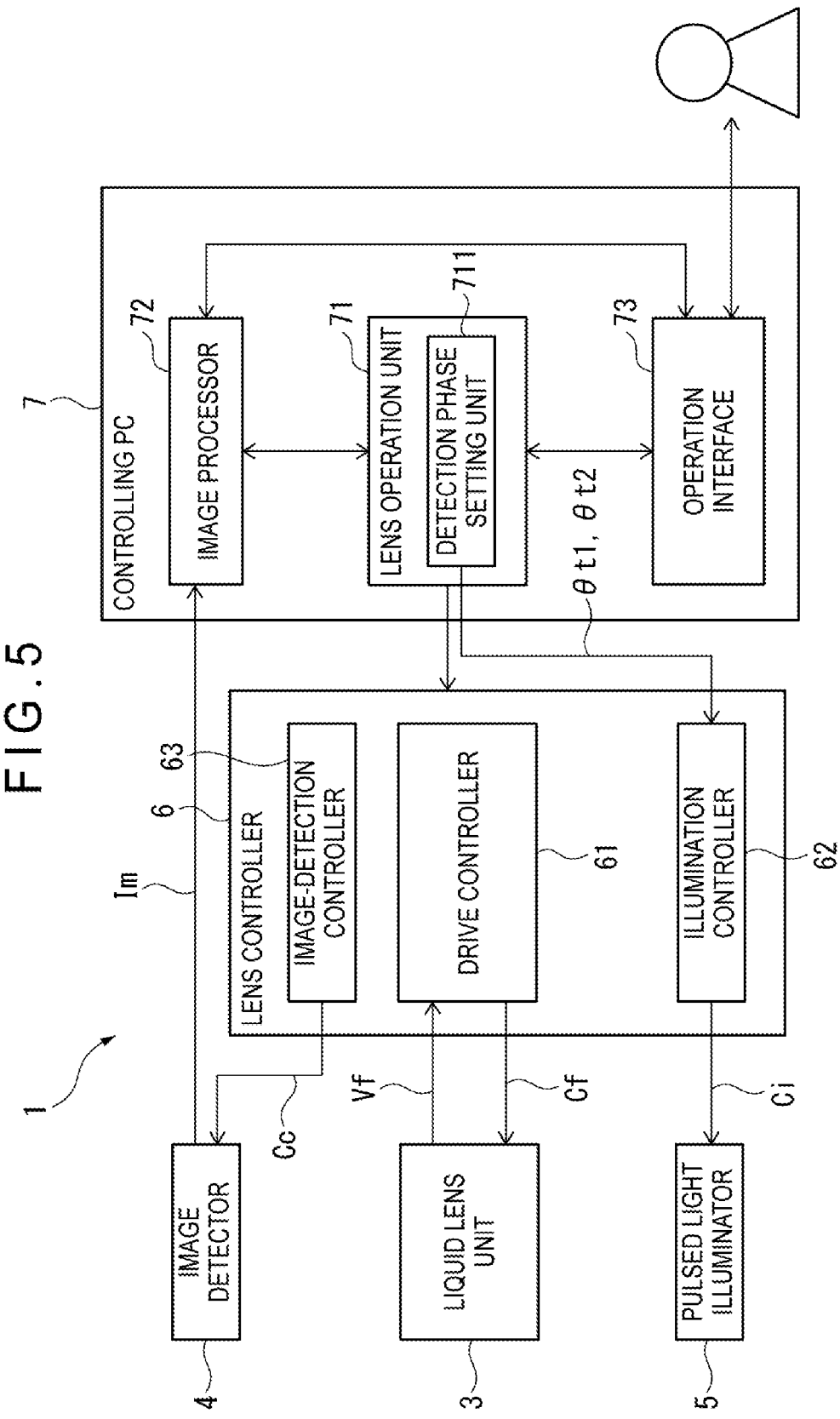
FIG. 5 is a block diagram showing a control configuration in the exemplary embodiment.

As shown in FIG. 5, the lens controller 6 is configured to control the oscillation in the liquid lens unit 3, light emission by the pulsed light illuminator 5, and image detection by the image detector 4. Specifically, the lens controller 6 includes: a drive controller 61 configured to output the drive signal Cf to the liquid lens unit 3; an illumination controller 62 configured to output the illumination signal Ci to the pulsed light illuminator 5; and an image-detection controller 63 configured to output the image-detection signal Cc to the image detector 4.

An effective power, a drive current or the like applied to the liquid lens unit 3 as an index for an oscillation conditions Vf of the liquid lens unit 3 is inputted to the drive controller 61. The drive controller 61 outputs the drive signal Cf whose frequency is tuned in accordance with the oscillation conditions Vf of the liquid lens unit 3 to the liquid lens unit 3.

The illumination controller 62 outputs the illumination signal Ci to the pulsed light illuminator 5 based on detection phases θs1, θs2 inputted from a later-described detection phase setting unit 711. Specifically, the illumination controller 62 is configured to raise the illumination signal Ci for a predetermined time when the phase of the drive signal Cf reaches the detection phases θs1 and θs2.

The image-detection controller 63 is configured to output the image-detection signal Cc to the image detector 4 based on detection conditions (e.g. exposure time) set in the lens operation unit 71.

The controlling PC 7 includes: a lens operation unit 71 configured to make the setting for the lens controller 6; an image processor 72 configured to import and process the detected image Im from the image detector 4; and an operation interface 73 configured to receive a user's operation on the variable focal length lens device 1.

It should be noted that the lens operation unit 71 includes the detection phase setting unit 711. The detection phase setting unit 711 is configured to calculate the detection phases θs1, θs2 based on designated focal length Df of the liquid lens unit 3 and input the calculated detection phases θs1, θs2 to the illumination controller 62.

Image Detection Processing

Procedures for an image detection processing in the present exemplary embodiment will be described below.

At the start of the image detection processing, the detection phase setting unit 711 initially receives an input of designation of the focal length Df (designated focal distance Dfs) of the liquid lens unit 3. The designated focal distance Dfs may be inputted by, for instance, a user's operation through the operation interface 73 or a predetermined processing by the lens operation unit 71.

Subsequently, the detection phase setting unit 711 calculates the detection phases θs1, θs2 based on the designated focal distance Dfs with a use of a table or a calculation formula representing an interrelationship between the designated focal distance Dfs and the detection phases θs1, θs2.

Figure 6:
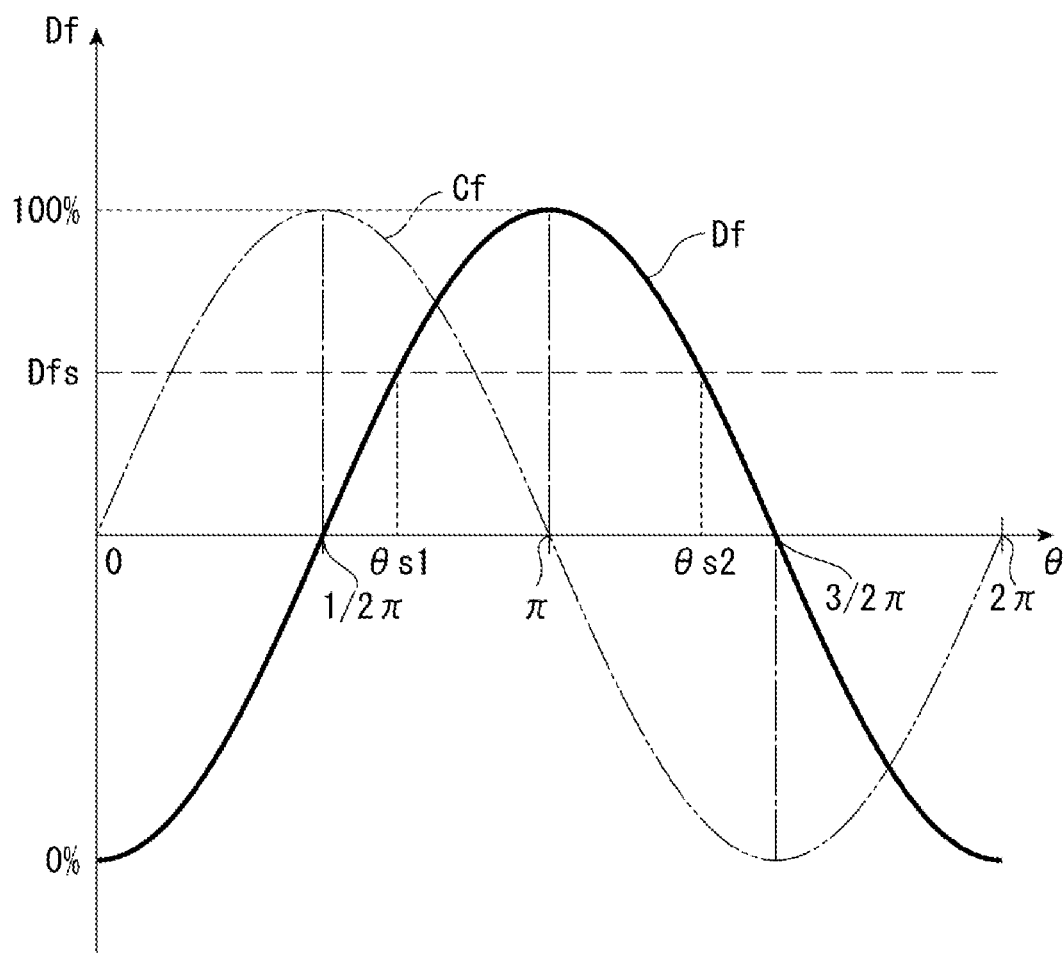
FIG. 6 is a graph showing a relationship between a phase of a drive signal and a designated focal distance in a table or a calculation formula in the exemplary embodiment.

In the table or the calculation formula referred to by the detection phase setting unit 711, the interrelationship between the detection phases θs1, θs2 and the designated focal distance Dfs basically corresponds to the relationship between a phase θ of the drive signal Cf and the focal length Df shown in FIG. 6, where the detection phase θs is defined in a range of 2π. Accordingly, two detection phases θs1, θs2 are associated with one designated focal distance Dfs in the table or the calculation formula referred to by the detection phase setting unit 711, as in the example shown in FIG. 6.

The detection phase setting unit 711 then inputs the detection phases θs1, θs2, which are calculated based on the designated focal distance Dfs, to the illumination controller 62.

After the setting is done by the lens operation unit 71, the image-detection controller 63 outputs the image-detection signal Cc in accordance with the designated detection conditions (e.g. exposure time). The image detector 4 performs the exposure process for a predetermined time (i.e. a time corresponding to a plurality of cycles of the drive signal Cf) in response to the inputted image-detection signal Cc.

Figure 7:
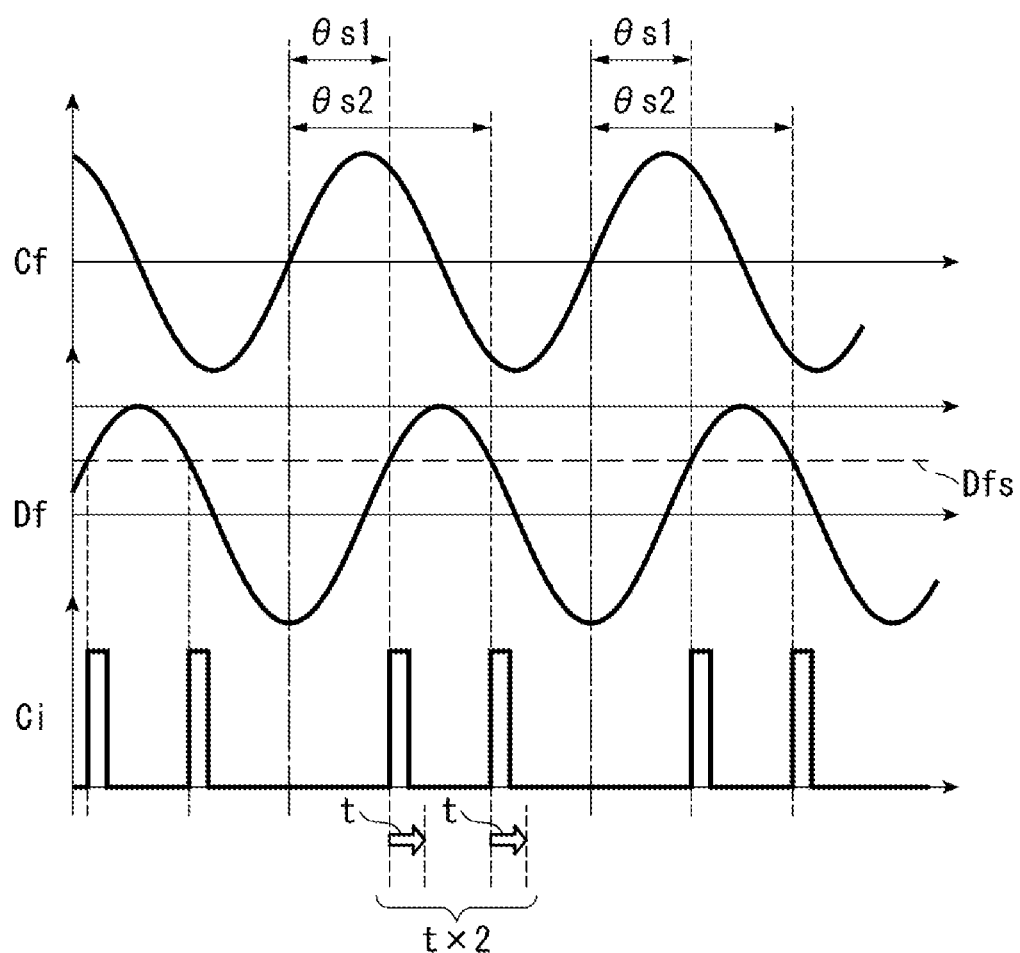
FIG. 7 is a graph showing a change in the drive signal, a focal length, and an illumination signal in the exemplary embodiment.

During the period of the exposure period by the image detector 4, the illumination signal Ci outputted by the illumination controller 62 rises in each cycle of the drive signal Cf in synchronization with the detection phases θs1, θs2, as shown in FIG. 7. The pulsed light illuminator 5 emits light for a predetermined illumination time t from the timing at which the inputted illumination signal Ci rises. Thus, the measurement target 9 is illuminated with the pulsed light at each of two timings when the focal length Df of the liquid lens unit 3 reaches the designated focal distance Dfs, in each cycle of the drive signal Cf. A total time of the pulsed light illumination in each cycle of the drive signal Cf is equal to "illumination time t×2."

The image detector 4 detects the image Lg of the measurement target 9 illuminated with the pulsed light during the exposure period and outputs the image Lg as a detected image Im. The image processor 72 imports a plurality of the detected images Im and superimposes the detected images Im to form an image.

Image Detection Processing in Comparative

Next, procedures for an image detection processing in Comparative will be described below, focusing mainly on the difference from the present exemplary embodiment.

It should be noted that a variable focal length lens device according to Comparative is substantially the same as the variable focal length lens device of the present exemplary embodiment except that a processing method by the detection phase setting unit 711 is different from that in the present exemplary embodiment. It should be noted that corresponding features and reference numerals of the present exemplary embodiment will be used below for the description of Comparative.

In Comparative, the detection phase setting unit 711 calculates the detection phase θs based on the designated focal distance Dfs with a use of a table or a calculation formula representing the interrelationship between the designated focal distance Dfs and the detection phase θs.

Figure 8:
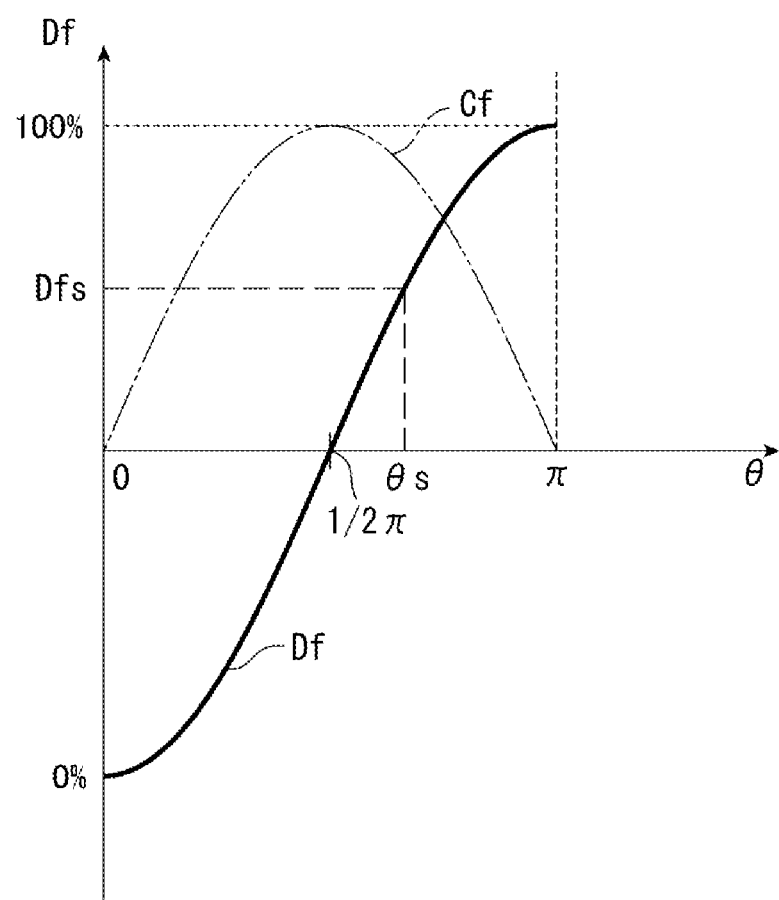
FIG. 8 is a graph showing a relationship between the phase of the drive signal and the designated focal distance in a table or a calculation formula in Comparative.

In the table or the calculation formula referred to by the detection phase setting unit 711, the interrelationship between the detection phase θs and the designated focal distance Dfs is determined based on the relationship between the phase θ of the drive signal Cf and the focal length Df shown in FIG. 8, where the detection phase θs is defined in a range of π. Accordingly, one detection phase θs is associated with one designated focal distance Dfs in the table or the calculation formula of Comparative as exemplarily shown in FIG. 8.

The detection phase setting unit 711 then inputs the single detection phase θs, which is calculated based on the designated focal distance Dfs, to the illumination controller 62.

Figure 9:
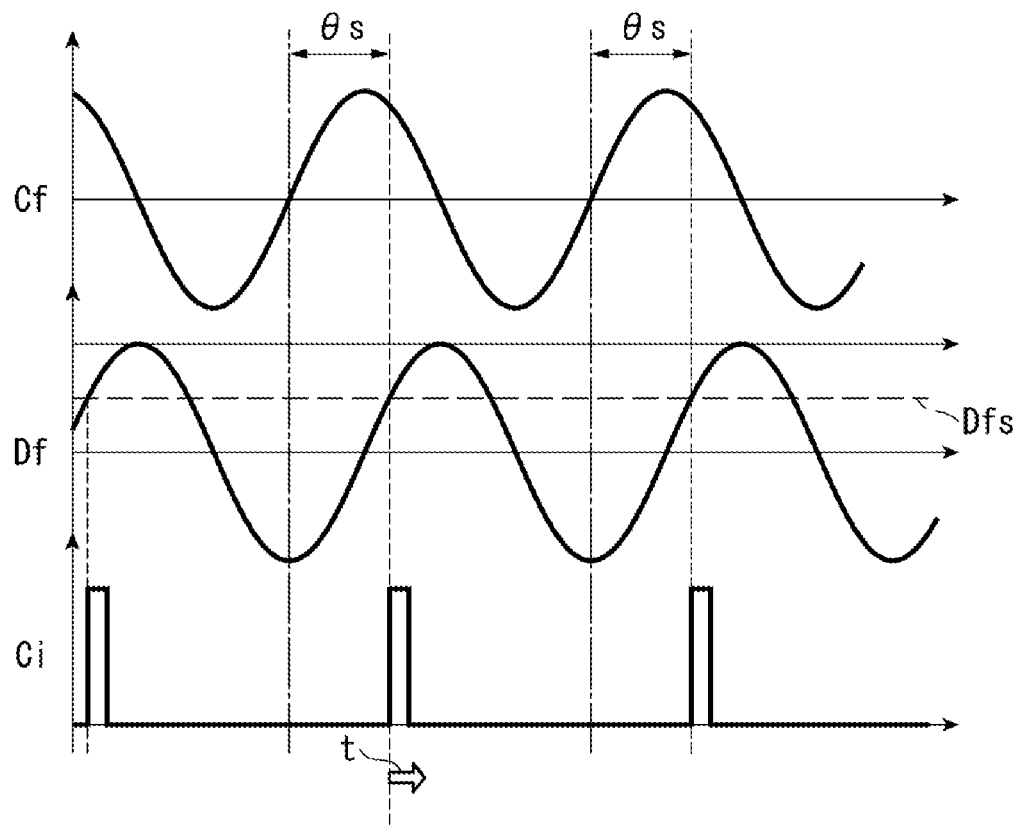
FIG. 9 is a graph showing a change in the drive signal, the focal length, and the illumination signal in Comparative.

In Comparative, the illumination signal Ci outputted by the illumination controller 62 rises in each cycle of the drive signal Cf in synchronization with the detection phase θs, as shown in FIG. 9. The pulsed light illuminator 5 emits light for the predetermined illumination time t from the timing at which the inputted illumination signal Ci rises. Thus, the measurement target 9 is illuminated with the pulsed light once in each cycle of the drive signal Cf when the focal length Df of the liquid lens unit 3 reaches the designated focal distance Dfs. The total time of the pulsed light illumination in each cycle of the drive signal Cf is equal to the illumination time t.

Comparison Between the Present Exemplary Embodiment and Comparative

As compared with Comparative, the above-described present exemplary embodiment can detect the image Lg two times as many times as that in Comparative in each cycle of the drive signal Cf. In other words, the number of the image Lg detection per time (detection frequency) can be doubled as compared with Comparative in the present exemplary embodiment.

Thus, in the present exemplary embodiment, a total illumination time in one cycle of the drive signal Cf can be extended twice as long as that in Comparative with the same illumination time of the pulsed light illuminator 5. Accordingly, when the exposure process by the image detector 4 is continued during a plurality of cycles of the drive signal Cf in order to obtain a sufficiently bright image, the total exposure time can be reduced in the present exemplary embodiment to half of the exposure time in Comparative without changing the illumination time of one shot of pulsed light of the pulsed light illuminator 5. Thus, the time required for forming a sufficiently bright image can be reduced.

Alternatively, when the exposure time in the present exemplary embodiment is the same as the exposure time in Comparative, the illumination time t of the pulsed light illuminator 5 in the present exemplary embodiment may be reduced to half of the illumination time in Comparative. Thus, the present exemplary embodiment can detect less blurred image Lg for the same exposure time as that in Comparative.

Setting for Region Near Peak

It is mentioned in the above description for the image detection processing that, in the table of the calculation formula referred to by the detection phase setting unit 711, the interrelationship between the detection phases $\theta s1$, $\theta s2$ and the designated focal distance Dfs basically corresponds to the relationship between a phase $\theta$ of the drive signal Cf and the focal length Df. However, when the designated focal distance Dfs is near a peak of the focal length Df, the interrelationship between the detection phases $\theta s1$, $\theta s2$ and the designated focal distance Dfs is determined differently from the above-described basic relationship in the present exemplary embodiment. Specific explanation will be given below.

Figure 10:
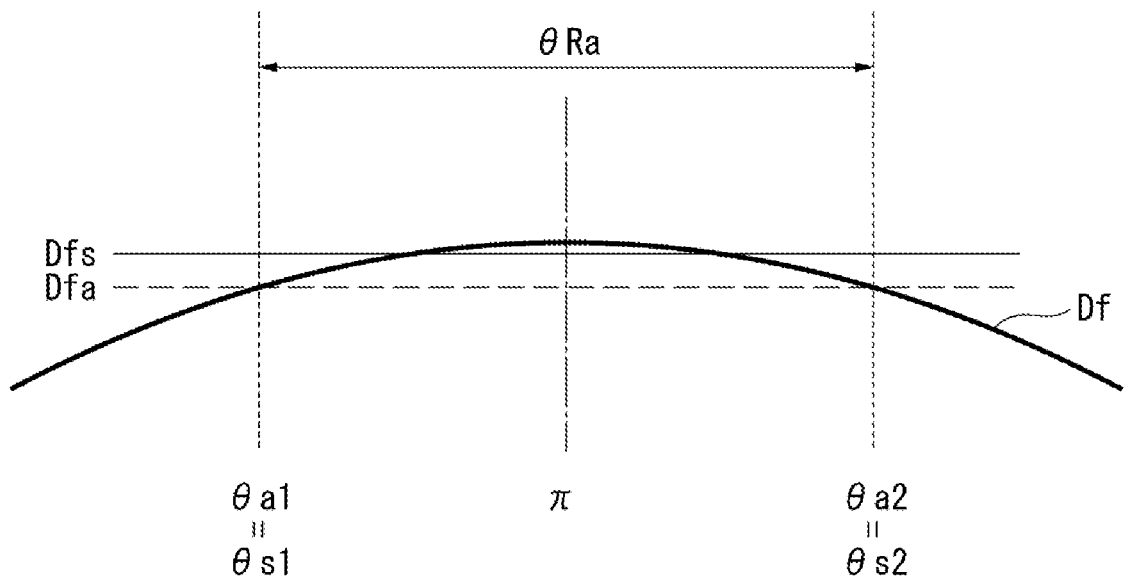
FIG. 10 is a partially enlarged graph showing a change in the focal length in a near-peak region.

FIG. 10 is an enlarged view of a region near a positive peak of a variation waveform of the focal length Df.

As shown in FIG. 10, when the designated focal distance Dfs is larger than a first predetermined value Dfa defined near the positive peak of the focal length Df (Dfa<Dfs), the detection phases $\theta s1$, $\theta s2$ corresponding to the designated focal distance Dfs are set to be equal to a start phase $\theta a1$ and an end phase $\theta a2$, respectively, of the near-peak region $\theta Ra$.

The near-peak region $\theta Ra$ is a phase range defined around a phase $\pi$ of the drive signal Cf, at which the focal length Df reaches the positive peak. The first predetermined value Dfa is a value of the focal length Df corresponding to the start phase $\theta a1$ and the end phase $\theta a2$ of the near-peak region $\theta Ra$.

Figure 11:
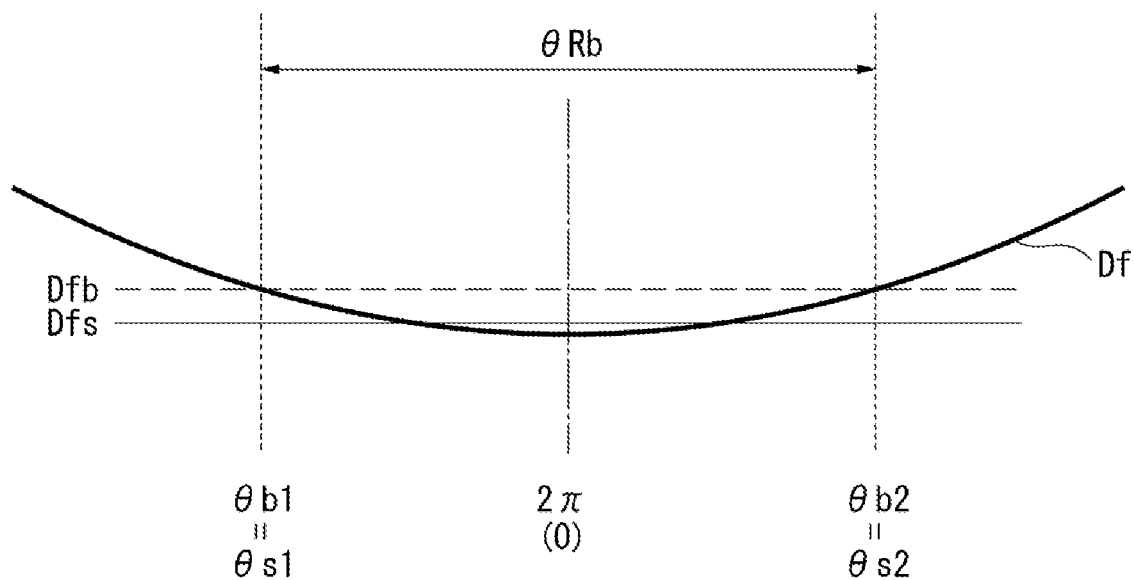
FIG. 11 is another partially enlarged graph showing the change in the focal length in another near-peak region.

FIG. 11 is an enlarged view of a region near a negative peak of the variation waveform of the focal length Df.

As shown in FIG. 11, when the designated focal distance Dfs is larger than a second predetermined value Dfb defined near the negative peak of the focal length Df (Dfs<Dfb), the detection phases $\theta s1$, $\theta s2$ corresponding to the designated focal distance Dfs are defined to be equal to a start phase $\theta b1$ and an end phase $\theta b2$, respectively, of the near-peak region $\theta Rb$.

The near-peak region $\theta Rb$ is a phase range defined around a phase $2\pi$ (or 0) of the drive signal Cf at which the focal length Df reaches the negative peak. The second predetermined value Dfb is a value of the focal length Df corresponding to the start phase $\theta b1$ and the end phase $\theta b2$ of the near-peak region $\theta Rb$.

Widths of the near-peak regions $\theta Ra$, $\theta Rb$ are each defined so that a time corresponding to each of the near-peak regions $\theta Ra$, $\theta Rb$ becomes equal to or more than a sum of a time of one shot of pulse emission (pulse emission time) by the pulsed light illuminator 5 and a preparation time (e.g. charging time) for the next light emission.

With the above setting, it does not occur that the illumination signal Ci for the second pulsed light illumination rises during the first pulsed light illumination or during the charging time for the next light emission. Thus, the pulsed light illumination can be safely applied twice in each cycle of the drive signal Cf.

It should be noted that, since the variation in the focal length Df is small with respect to the variation in the phase in the region near the positive or negative peak, the image Lg is sufficiently restrained from being blurred even when the detection phases $\theta s1$, $\theta s2$ are set as described above for the designated focal distance Dfs near the peak of the focal length Df.

When the designated focal distance Dfs is in a range from the first predetermined value Dfa to the second predetermined value Dfb (Dfb≤Ds≤Dfa), the above-described basic relationship applies. In other words, the relationship between the phase $\theta$ of the drive signal Cf and the focal length Df corresponds to the relationship between the phase $\theta$ of the drive signal Cf and the focal length Df.

Advantage(s) of the Present Exemplary Embodiment

The present exemplary embodiment, in which the pulsed light illumination is applied twice in one cycle of the drive signal Cf as described above, can reduce the time required for forming a sufficiently bright image.

Alternatively, the illumination time for one shot of pulsed illumination can be reduced, so that less blurred image Lg can be detected without increasing the exposure time.

In the present exemplary embodiment, when the designated focal distance Dfs is near a peak of the focal length Df, the detection phases $\theta s1$, $\theta s2$ are determined so that the time corresponding to the phase width between the detection phases $\theta s1$, $\theta s2$ is equal to or more than the sum of the illumination time for one shot of the pulsed light by the pulsed light illuminator 5 and the preparation time for the next light emission.

Accordingly, irrespective of the value of the designated focal distance Dfs inputted within the variable range of the focal length Df, the pulsed light illumination can be safely applied twice in one cycle.

Modification(s)

It should be understood that the scope of the invention is not limited to the above-described exemplary embodiment(s) but includes modifications and the like compatible with an object of the invention.

Figure 12:
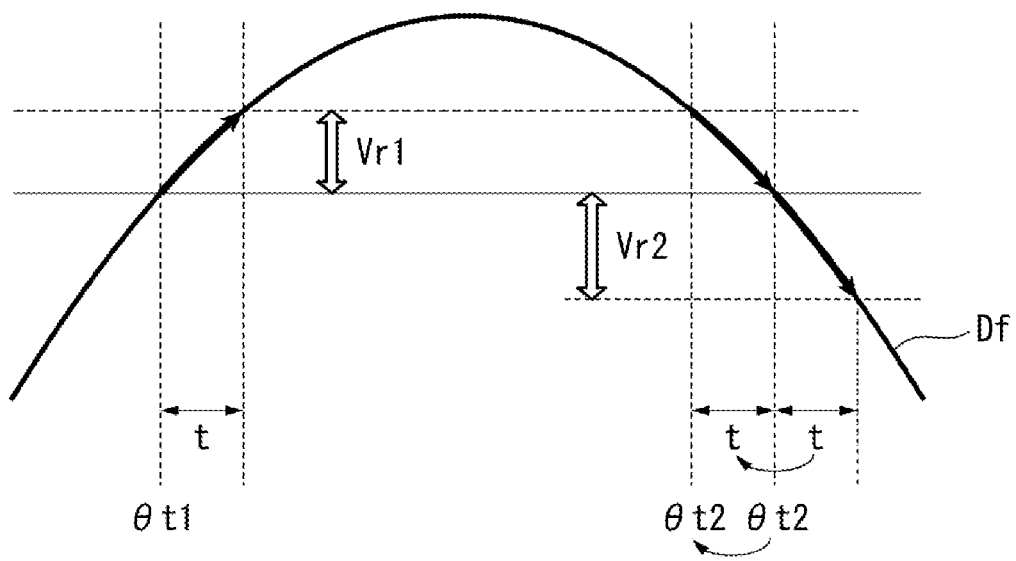
FIG. 12 is a partially enlarged graph showing the change in the focal length in a modification of a detection phase.

For instance, as shown in FIG. 12, a variable range Vr1 of the focal length Df in the illumination time t corresponding to the detection phase $\theta s1$ is not, in a strict meaning, the same as a variable range Vr2 of the focal length Df in the illumination time t corresponding to the detection phase $\theta s2$. The difference between the variable ranges Vr1, Vr2, which is exaggerated in the figure, is actually extremely small as compared with an entire variable range of the focal length Df. Accordingly, the image obtained in the exemplary embodiment is not disadvantageously blurred or the like.

However, when it is demanded that the above difference should be eliminated, one of the detection phases $\theta s1$ and $\theta s2$ (the detection phase $\theta s2$ in FIG. 2) may be shifted backward by the phase width corresponding to the illumination time t for one pulsed light illumination.

The inputted designated focal distance Dfs, whose value has no effect in the number of the pulsed light illumination (i.e. twice in one cycle) in the exemplary embodiment, is treated otherwise in some embodiments of the invention.

For instance, the detection phase setting unit 711 is configured to define two detection phases $\theta t1$, $\theta t2$ only when the designated focal distance Dfs is within a predetermined range (e.g. Dfb≤Dfs≤Dfa) and define a single detection phase when the inputted designated focal distance Dfs is out of the predetermined range (e.g. Dfa<Dfs, Dfs<Dfb) in some embodiments.

The pulsed light illuminator 5, which is configured to emit the illumination light Li for a predetermined time upon the rise of the illumination signal Ci inputted from the lens controller 6 in the exemplary embodiment, is configured otherwise in some embodiments of the invention.

For instance, the pulsed light illuminator 5 is configured to emit the illumination light Li for a predetermined time upon decline of the inputted illumination signal Ci in some embodiments. Alternatively, the pulsed light illuminator 5 is configured to emit the illumination light Li while the inputted illumination signal Ci is kept in the rise (or decline), in some embodiments.

The combination of the lens controller 6 and the controlling PC 7, which is used in order to drive and control the liquid lens unit 3 in the exemplary embodiment, is configured as an integrated device for driving, controlling, and operating the liquid lens unit 3 in some embodiments of the invention. However, the use of the combination of the lens controller 6 and the controlling PC 7 as in the exemplary embodiment allows the use of hardware required for driving and controlling the liquid lens unit 3 in a form of an independent dedicated lens controller.

The drive signal Cf and the focal-point-variation waveform Mf, which are sinusoidal wave in the exemplary embodiment, are each independently a triangular wave, saw-tooth wave, rectangular wave or the like in some embodiments of the invention.

The specific arrangement of the liquid lens unit 3 may be altered, where the casing 31 and the oscillator 32 may be each independently a hexagonal cylinder or the like instead of the circular cylinder, and the dimension of the casing 31 and the oscillator 32 and the nature of the liquid 35 may be changed as required.

What is claimed is:

1. A variable focal length lens device comprising:
   a variable focal length lens whose focal length is cyclically changeable in accordance with an inputted drive signal;
   an image detector configured to detect an image of a measurement target through the variable focal length lens;
   a pulsed light illuminator configured to emit a pulsed light to illuminate the measurement target; and
   an illumination controller configured to control the pulsed light illuminator so that the pulsed light is emitted twice in one cycle of the drive signal based on two detection phases corresponding to a designated focal distance of the variable focal length lens.

2. The variable focal length lens device according to claim 1, further comprising:
   a detection phase setting unit configured to calculate the two detection phases corresponding to the designated focal distance based on the designated focal distance of the variable focal length lens, and set the two calculated detection phases in the illumination controller, wherein
   when the designated focal distance is larger than a first predetermined value defined near a positive peak of the focal length or smaller than a second predetermined value defined near a negative peak of the focal length, the detection phase setting unit calculates the two detection phases so that a time corresponding to a phase width between the two detection phases is equal to or more than a sum of a pulse emission time for one shot of the pulsed light by the pulsed light illuminator and a preparation time for a next light emission.

3. A control method of a variable focal length lens device comprising: a variable focal length lens whose focal length is cyclically changeable in accordance with an inputted drive signal; an image detector configured to detect an image of a measurement target through the variable focal length lens; and a pulsed light illuminator configured to emit a pulsed light to illuminate the measurement target, the method comprising:
   controlling the pulsed light illuminator to emit the pulsed light twice in one cycle of the drive signal based on two detection phases of the drive signal corresponding to a designated focal distance of the variable focal length lens.

\* \* \* \* \*